US012701121B2

(12) United States Patent
Garg

(10) Patent No.: US 12,701,121 B2
(45) Date of Patent: Aug. 4, 2026

(54) ENTITLEMENT ENGINE FOR CERTIFYING USER PERMISSIONS

(71) Applicant: Truist Bank, Charlotte, NC (US)

(72) Inventor: Sidharth Garg, Atlanta, GA (US)

(73) Assignee: TRUIST BANK, Charlotte, NC (US)

( * ) Notice: Subject to any disclaimer, the term of this patent is extended or adjusted under 35 U.S.C. 154(b) by 531 days.

(21) Appl. No.: 18/155,197

(22) Filed: Jan. 17, 2023

(65) Prior Publication Data

US 2024/0244060 A1    Jul. 18, 2024

(51) Int. Cl.
*H04L 9/40* (2022.01)

(52) U.S. Cl.
CPC .......... *H04L 63/104* (2013.01); *H04L 63/102* (2013.01); *H04L 63/105* (2013.01)

(58) Field of Classification Search
CPC ............. H04L 63/10–105; H04L 63/08; G06F 21/604; H04W 12/06; H04W 12/08
See application file for complete search history.

(56) References Cited

U.S. PATENT DOCUMENTS

| | | | | | |
|---|---|---|---|---|---|
| 7,657,932 | B2 * | 2/2010 | Ballinger | ................ | H04L 67/02 |
| | | | | | 713/172 |
| 11,770,374 | B1 * | 9/2023 | McCormick | .......... | G06F 16/215 |
| | | | | | 726/7 |
| 2005/0283372 | A1 * | 12/2005 | Jorgenson | .............. | G06Q 30/02 |
| | | | | | 726/28 |
| 2011/0107411 | A1 * | 5/2011 | McClain | ............... | H04L 63/102 |
| | | | | | 726/9 |
| 2011/0167483 | A1 * | 7/2011 | Lee | ...................... | G06F 21/6218 |
| | | | | | 726/6 |
| 2016/0094530 | A1 * | 3/2016 | Mihaylov | ............... | H04L 63/08 |
| | | | | | 726/7 |
| 2017/0134393 | A1 * | 5/2017 | Islam | .................... | H04W 12/06 |

* cited by examiner

*Primary Examiner* — Daniel B Potratz
(74) *Attorney, Agent, or Firm* — Michael A. Springs, Esq.; Shumaker, Loop & Kendrick, LLP; Patrick B. Horne

(57) ABSTRACT

A system and method for providing an entitlement engine and certifying user permissions is described herein. The system presenting a graphical user interface displaying an entitlement engine to a primary user to select permissions for a list of secondary users for application features and transmitting the selected permissions to a server computer for storing on a user profile and generating an entitlement logic code based on the user's profile. The entitlement logic code is utilized to generate a graphical user interface displaying the user dashboard for the secondary user upon receiving a request from the secondary user and validating the secondary user based on authentication data.

17 Claims, 5 Drawing Sheets

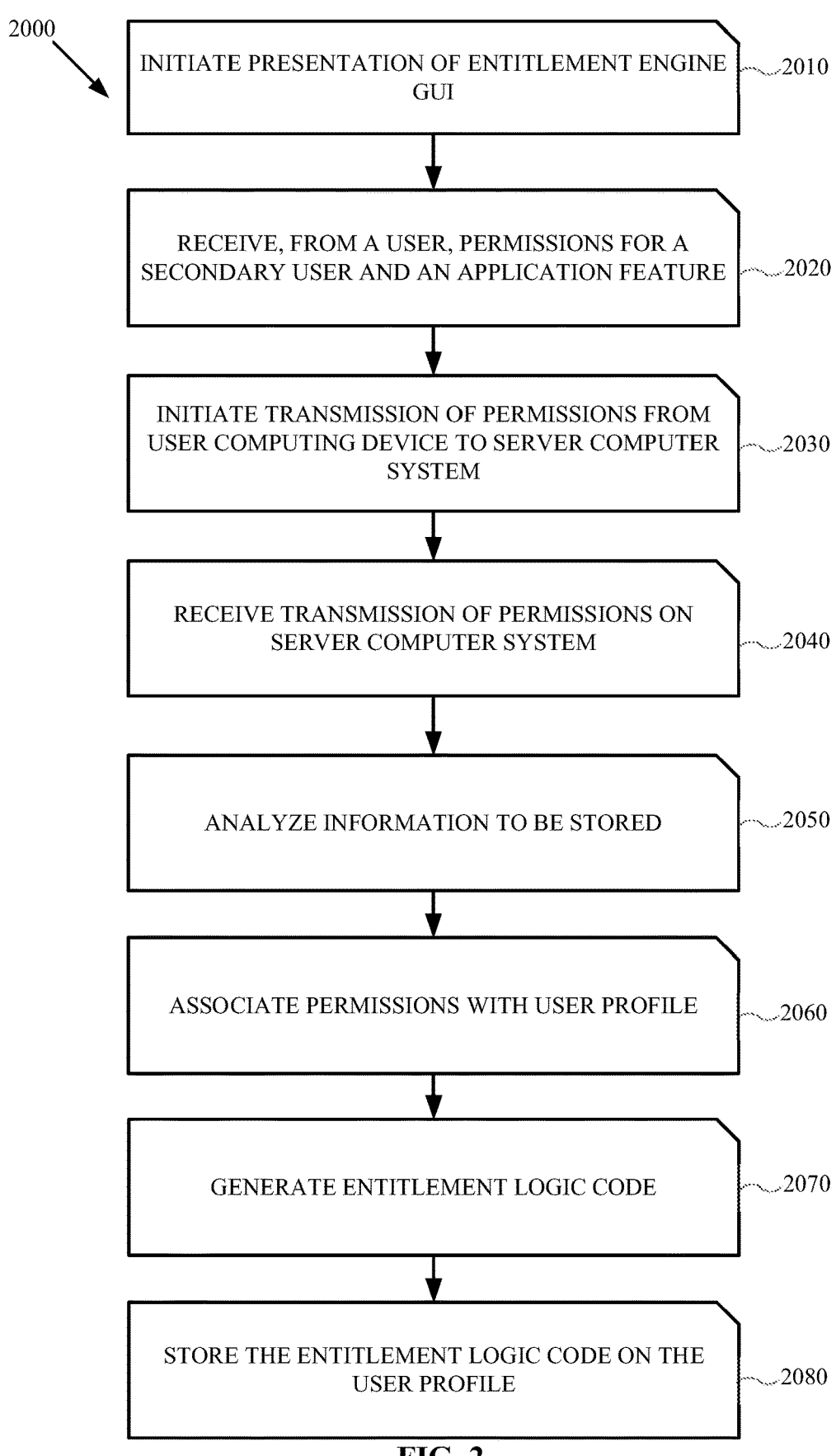

2000

INITIATE PRESENTATION OF ENTITLEMENT ENGINE GUI ⎯2010

RECEIVE, FROM A USER, PERMISSIONS FOR A SECONDARY USER AND AN APPLICATION FEATURE ⎯2020

INITIATE TRANSMISSION OF PERMISSIONS FROM USER COMPUTING DEVICE TO SERVER COMPUTER SYSTEM ⎯2030

RECEIVE TRANSMISSION OF PERMISSIONS ON SERVER COMPUTER SYSTEM ⎯2040

ANALYZE INFORMATION TO BE STORED ⎯2050

ASSOCIATE PERMISSIONS WITH USER PROFILE ⎯2060

GENERATE ENTITLEMENT LOGIC CODE ⎯2070

STORE THE ENTITLEMENT LOGIC CODE ON THE USER PROFILE ⎯2080

FIG. 2

|  | ADMIN | STANDARD |
|---|---|---|
| FULL ACCESS | PRIMARY USER | SECONDARY USER TYPE 2 |
| CUSTOM ACCESS | SECONDARY USER TYPE 1 | SECONDARY USER TYPE 3 |

FIG. 5

ENTITLEMENT ENGINE FOR CERTIFYING USER PERMISSIONS

FIELD

This invention is related generally to the field of entitlements and permissions to computer-related resources, and more particularly embodiments of the invention relate to assigning and determining a user's entitlements.

BACKGROUND OF THE INVENTION

Organizations utilize multiple network-provided resources. Different users may have different roles within the organization, and thus different duties within the internet-related resources. Administering user's entitlements to these network-provided resources is a vital part of an organizations security and infrastructure.

Many entitlement management systems assign permissions and entitlement based on a user's assignment to a specific group. However each user may have a very specific role and may have a very specific roles and thus may have very specific permissions within the network-provided resource. Therefore, a need exists to assign and certify user permissions on a per-user basis rather than by assigning a user to a specific group.

BRIEF SUMMARY

Embodiments of the present invention address the above needs and/or achieve other advantages by providing apparatuses and methods for certifying user permissions via an entitlement engine.

In one aspect, a system for certifying user permissions is described. The system comprising a user computing device and a server computer system, each with at least one processor, a memory, and a communication device. The user computing device is configured to: initiate presentation of a graphical user interface enabling display of an entitlement engine, the entitlement engine comprising a list of secondary users and a list of application features; receive user input selecting one or more permissions corresponding to a secondary user and an application feature; and initiate transmission of the permissions across a communication channel between the user computing device and the server computer system. The server computer system is configured to: receive the transmission from the user computing device of the permissions; analyzed the received transmission to identify information for storage such as the permissions corresponding to a secondary user and an application feature, associate the permissions with a user profile for the secondary user, generate an entitlement logic code based on the secondary user's user profile, and store the entitlement logic code in the secondary user's user profile.

In some embodiments, the user computing device is further configured to: receive input from a secondary user comprising a request for access to an application and user authentication data; and initiate a transmission of the user authentication data between the user computing device and the server computer system across the communication channel. The server computer system is further configured to: receive the transmission of user authentication data from the user computer device; validate the user based on the user authentication data; retrieve a user profile associated with the secondary user; retrieve the stored entitlement logic code from the user profile, and initiate a transmission of the stored entitlement logic code between the server computer system and the user computing device. The user computing device may be further configured to receive the transmission of the stored entitlement logic code from the server computer system; and initiate presentation of a second graphical user interface display of the secondary user's dashboard displaying services and data based on the stored entitlement logic code.

In another aspect, a system for certifying user permissions is described. The system comprising a user computing device and a server computer system, each with at least one processor, a memory, and a communication device. The user computing device is configured to: receive input from a secondary user comprising a request for access to an application and user authentication data; and initiate a transmission of the user authentication data between the user computing device and the server computer system across the communication channel. The server computer system is configured to: receive the transmission of user authentication data from the user computer device; validate the user based on the user authentication data; retrieve a user profile associated with the secondary user; generate an entitlement logic code based on the user profile and initiate a transmission of the entitlement logic code between the server computer system and the user computing device. The user computing device may be further configured to receive the transmission of the entitlement logic code from the server computer system; and initiate presentation of a second graphical user interface display of the secondary user's dashboard displaying services and data based on the entitlement logic code.

In yet another aspect, a method for certifying user permissions is described, the method being executed by a server computer system interoperating with a user computing device. The method includes: initiating presentation of a graphical user interface display of an entitlement engine, the entitlement engine showing a list of secondary users and a list of application features; receiving user input selecting one or more permissions corresponding to a secondary user and an application feature; initiating and receiving transmission of the selected permissions; analyzing the received transmission for information to be stored; associating the stored permissions with a user profile of the secondary users, generating an entitlement logic code based on the user profile, and storing the entitlement logic code on the user profile. The method may further including receiving a second user input from a secondary user comprising a request for access to an application and user authentication data; initiating a transmission between the user computing device and the server computing system of the user authentication data; receiving the transmission of user authentication data; validating the secondary user based on the user authentication data; retrieving the user profile of the secondary user; retrieving the stored entitlement logic code from the user profile; and initiating a transmission of the stored entitlement logic code between the server computer system and the user computing device. The method may further include: the user computing device receiving the transmission of the stored entitlement logic code; and initiating presentation of a graphical user interface display of the secondary user's dashboard comprising services and data based on the stored entitlement logic code.

According to embodiments of the invention, the user profile further includes one or more user attributes such as user location, user role, user name, and user hierarchy. In some embodiments, the user profile further includes user permissions. In some embodiments, the user type includes custom-access or full-access. Additionally, or alternatively, the user type may include administrator or standard. In some embodiments, the permissions include: viewing the application feature, using the application feature, and/or making changes to the application feature.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

Figure 1:
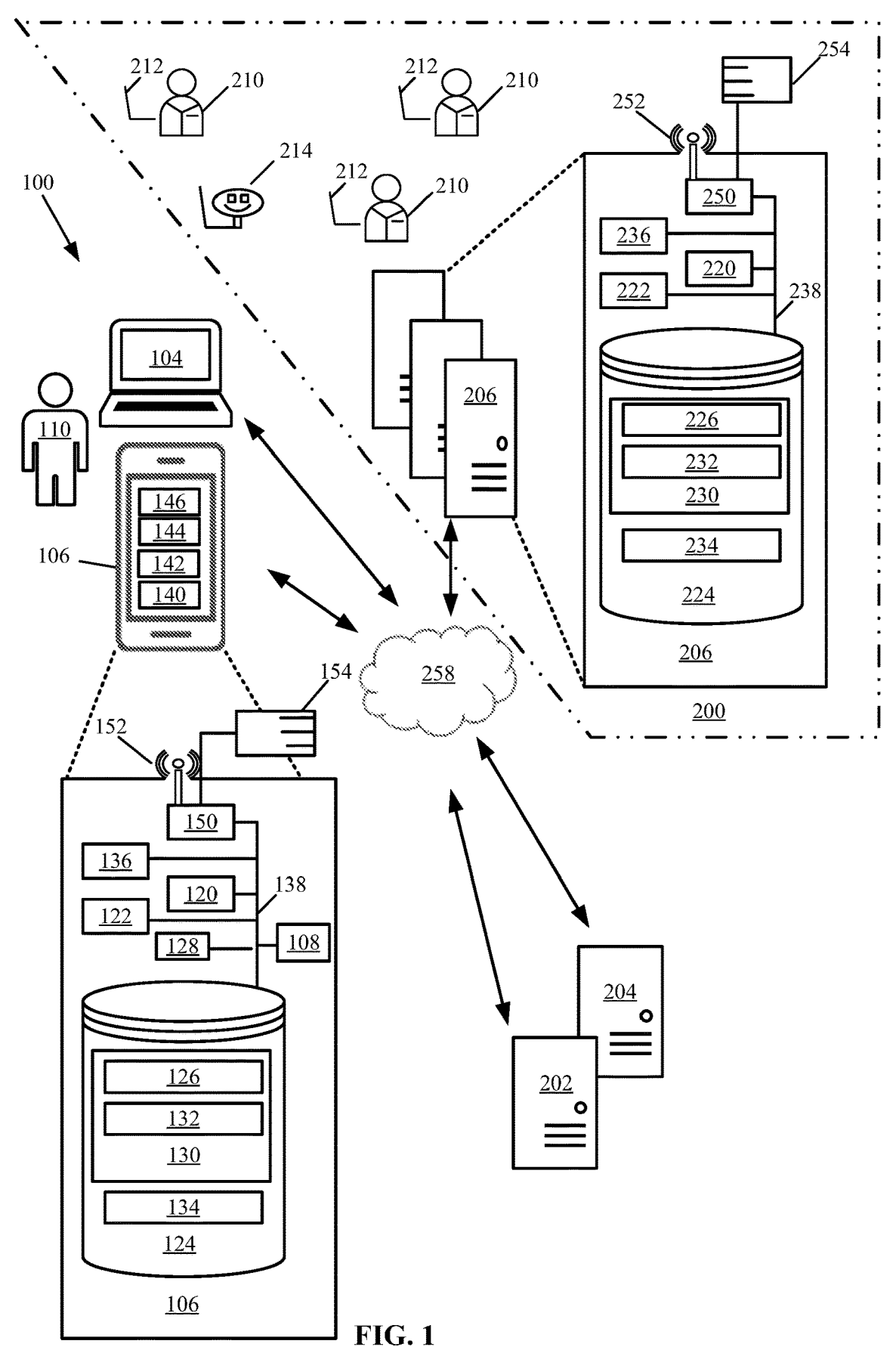

Having thus described embodiments of the invention in general terms, reference will now be made to the accompanying drawings, wherein:

FIG. 1 illustrates an enterprise system and environment thereof for certifying user permissions, in accordance with an embodiment of the present invention.

FIG. 2 is a flow diagram representing the steps for certifying user permissions in accordance with an embodiment of the present invention.

Figure 3:
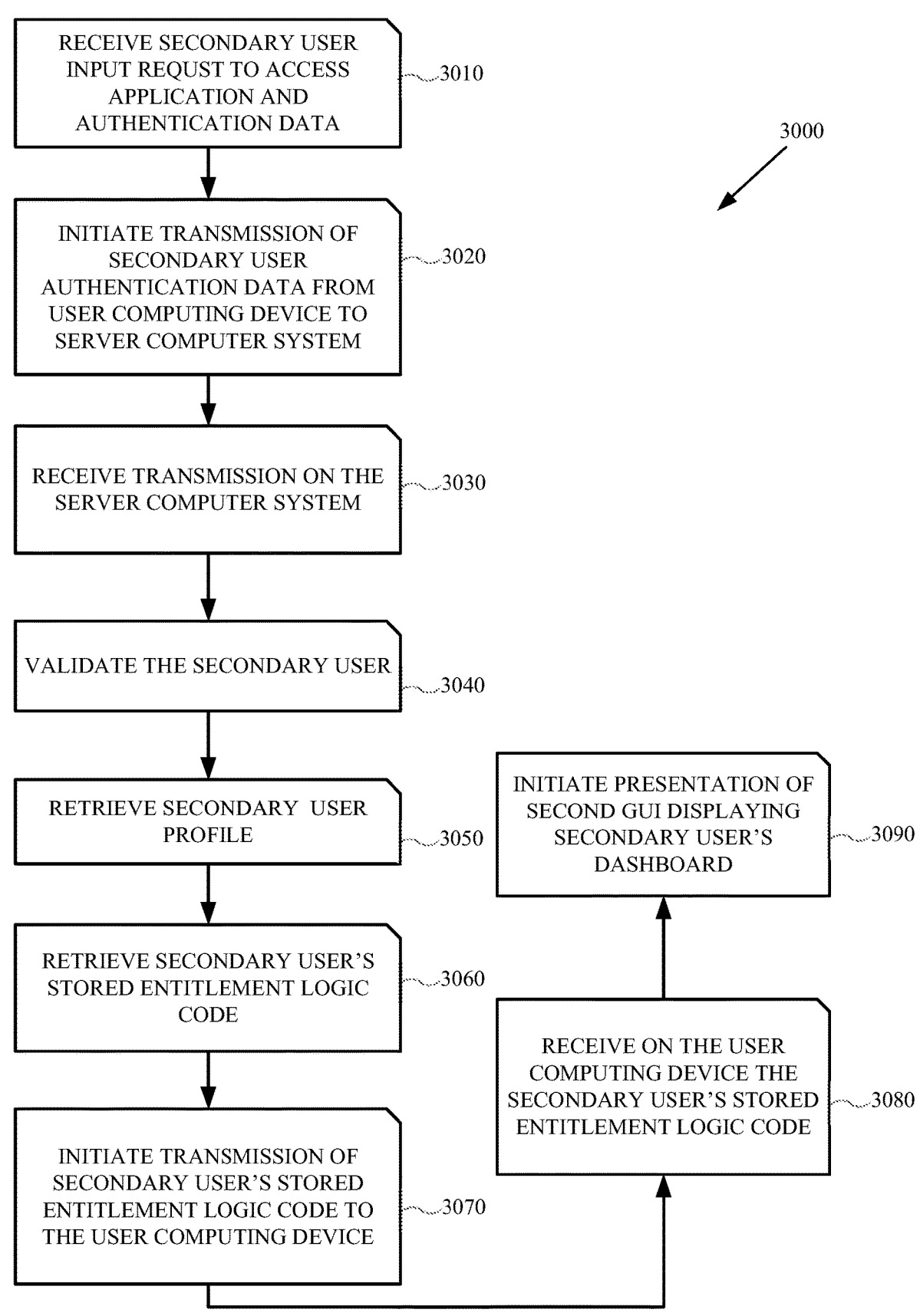

FIG. 3 is a flow diagram representing the steps for certifying user permissions in accordance with an embodiment of the present invention.

Figure 4:
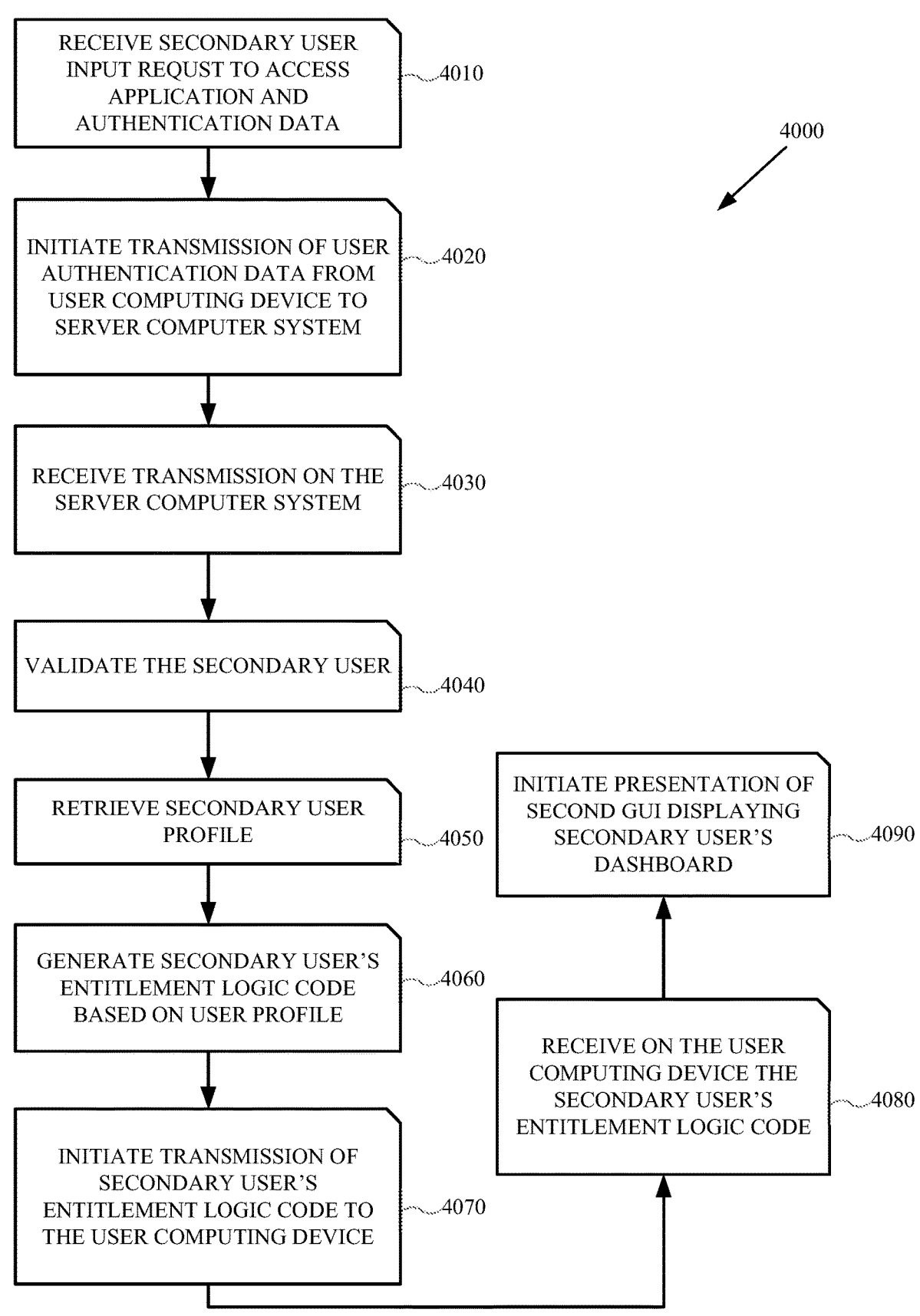

FIG. 4 is a flow diagram representing the steps for certifying user permission in accordance with an embodiment of the present invention.

FIG. 5 illustrates various user types, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus"

includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The environment may include, for example, a distributed cloud computing environment (private cloud, public cloud, community cloud, and/or hybrid cloud), an on-premise environment, fog computing environment, and/or an edge computing environment. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning system device (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing.

Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/ b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

With reference to the general architecture, features, and functions as described above, the present subject matter is also directed to applications in which the system is used in conjunction with providing an entitlements engine to determine permissions for a user within an online banking system. For example, business clients may have many different employees each with varying levels of desired access to the online banking system and corresponding accounts. The systems and methods described herein may provide an entitlement engine for certifying secondary user's permissions within the online banking system. These permissions may include access to various online banking services: such as access to payroll, fraud inspection, fraud prevention, transfer of funds, payment, etc. Additionally, or alternatively, the permissions may include viewing certain accounts within the online banking system, the ability to transfer resources into or out of those accounts, and/or the ability to open new accounts or close accounts. The entitlement engine allows the primary user to assign specific permissions for each secondary user. This results in the generation of a unique entitlement logic code for each secondary user based on their user profile—which includes the permissions assigned by the primary user. The user profile may also include the secondary user's location, title, name, hierarchy, and other information that may play a role in the secondary user's entitlements and thus the unique entitlement logic code for the secondary user.

FIG. 2 is a flow diagram for the entitlement engine where a primary user will assign permissions for one or more secondary users. At block 2010 a user computing device will initiate presentation of a graphical user interface displaying the entitlement engine to the primary user. The entitlement engine display may be a single screen displaying a list of secondary users and a second list of application features. The primary user may select which permissions each secondary user has for each of the application features. For example, a secondary user may have access to view a first account, view and make conduct interactions with a second account, and view, conduct interactions with, and make changes to a third account. The primary user will select the appropriate permissions for the secondary user for each account and/or application feature.

At block 2020, the user computing device will receive this input from the user, and at block 2030 initiate a transmission of the input to a server computer system. At bock 2040, the server computer system will receive the transmission of the selected permissions from the user computing system, and at block 2050 analyze the information and determine which information from the transmission should be stored, including the selected permissions. At block 2060, the permissions will be associated with the appropriate secondary user's profile. At block 2070, the server computer system will generate an entitlement logic code based on the secondary user's profile, and at block 2080 store the entitlement logic code on the user's profile. The entitlement logic code will take into account the user's profile which may include, not only the permissions assigned from the primary user, but also the secondary user's job title or role, the secondary user's user type, the secondary user's tenure within the organization, the secondary user's location, the secondary user's name, and the secondary user's hierarchy within the organization. The entitlement logic code will be unique for each secondary user, and may change as the user's profile changes and as the primary user updates the secondary user's permissions.

The user type may also be selected by the primary user in the entitlement engine. The user types are illustrated in FIG. 5. The user type may include the amount of access a user has, that is whether they have full access—the user can access every application feature based on their user profile, or whether they have custom access—the user can only access the application feature they've been given permission to access based on the primary user's selection. The user type may also include admin or standard. An admin-type user may make changes to application features, depending on the permissions assigned to the user by the primary user. A standard-type user may not be able to make changes to application features depending on the permissions assigned to the user by the primary user. In one example, as illustrated in FIG. 5, a primary user has both full-access and admin-type—thus can make changes to the permissions of secondary users. In the example illustrated in FIG. 5, a secondary user type 1 has custom-access and admin-type, this user may have selected access to application features and the ability to make changes to those selected application features, based on the permissions assigned by the primary user. To continue the example in FIG. 5, secondary user type 2 may have full-access to selected application features but only a selected ability to make changes to the application features, based on the permissions assigned by the primary user. To finish the example in FIG. 5, secondary user type 3, may have custom access to selected application features and the ability to make selected changes to those application features, based on the permissions assigned by the primary user. Although these four types of users are described as examples, the user type may include any ability to access or make changes to application features, based on the permissions assigned by a primary user, or the owner of the account/application.

The flow diagram of FIG. 3 illustrates the process of a secondary user's access. At block 3010, a user computing device receives input from a secondary user requesting access to the application and authentication data. At block 3020, the user computing device initiates transmission of the secondary user's authentication data to the server computer system. Upon receiving the transmission with the secondary user's authentication data at block 3030, the server computer system will validate the user at block 3040. After validation, at block 3050, the system will retrieve the secondary user's user profile and, at block 3060, retrieve the stored entitlement logic code from the secondary user's user profile.

At block 3070, the server computer system will initiate transmission of the stored entitlement logic code to the user computing device. After receiving the stored entitlement logic code, at block 3080, the user computing device will initiate presentation of a graphical user interface displaying the secondary user's dashboard based on the stored entitlement logic code at block 3090. The user dashboard will display the application features that the entitlement logic code communicates that the user has the ability to see or view within the dashboard. The user dashboard will enable the secondary user to interact with or make changes to the application features that the entitlement logic code communicates that the user has the ability to interact with or make changes to. This process would be the same upon primary user login as well, only the primary user's entitlement logic code would communicate that the primary user has full access and admin-type access to all application features including the ability to make changes to the entitlement engine for the secondary users.

In some embodiments, upon secondary user's access, the system would follow the process illustrated in FIG. 4. At block 4010, a user computing device receives input from a secondary user requesting access to the application and authentication data. At block 4020, the user computing device initiates transmission of the secondary user's authentication data to the server computer system. Upon receiving the transmission with the secondary user's authentication data at block 4030, the server computer system will validate the user at block 4040. After validation, at block 4050, the system will retrieve the secondary user's user profile and, at block 4060, generate an entitlement logic code from the secondary user's user profile. This includes generating the entitlement logic code based on the information stored in the user profile, including but not limited to: the user type, the user role, the user's location, the user's hierarchy, the user name, and the stored user permissions.

At block 5070, the server computer system will initiate transmission of the generated entitlement logic code to the user computing device. After receiving the generated entitlement logic code, at block 4080, the user computing device will initiate presentation of a graphical user interface displaying the secondary user's dashboard based on the generated entitlement logic code at block 4090.

The entitlement logic code generated in both processes described in FIGS. 2 and 4 comprises executable code that enables the user computing device to present a graphical user interface displaying the application features and functions for the user based on the user's entitlements. This code is generated based on the information stored in the user profile including the permissions assigned by the primary user and the user's information such as location, hierarchy, tenure, and other information. The code generated by the system is unique to each user at the specific time or iteration of the user's assigned permissions.

As an example, wherein the digital application is a business banking environment, the primary user may be the business owner or account owner. The secondary users may be employees within the organization that have access (limited or otherwise—as determined by the assigned permissions). The primary user may use the entitlement engine, as illustrated in FIG. 2, to assign permissions indicating which account each secondary user may have access to and what type of access they have. Additionally, or alternatively, the primary user can assign permissions indicating which account functionality the secondary users may have access to. For example, some users may need to have access to payroll, bill-pay, fraud reporting, or other online business banking services. The assigned permissions from the account owner, and the other information in the user profile will be used to generate the entitlement logic code. If the business has more than one location, the secondary user's location may come into play when generating the entitlement logic code. If a user is a manager, the user may have payroll functionality and that may be used when generating the entitlement logic code. As well as other information in the user's profile.

The systems and methods described herein constitute an improvement in conventional computer processing and digital security and has a practical application when utilized in, for example, a group digital account environment as described above. By providing an entitlement engine to allow primary users to select what permissions each of the secondary users may have within the digital account environment, incorporating the permissions into a user profile that is then utilized to generate an entitlement logic code for use in displaying a unique user dashboard to each of the secondary user, the system allows secondary user's to view and access only the information that the primary user has granted them access to—resulting in a more secure digital account. Existing methods would require the primary user to separate accounts into different digital account environments to control which users have access to each account and/or manually add secondary user's onto the account. By utilizing the systems and methods described herein the primary user can consolidate all accounts into one environment and use the entitlement engine to assign permissions individually for each secondary user corresponding to each account and/or account function.

Aspects of the present invention are described herein with reference to flowchart illustrations and/or block diagrams of computer-implemented methods and computing systems according to embodiments of the invention. It will be understood that each block of the flowchart illustrations and/or block diagrams, and combinations of blocks in the flowchart illustrations and/or block diagrams, can be implemented by computer readable program instructions that may be provided to a processor of a general purpose computer, special purpose computer, or other programmable data processing apparatus (the term "apparatus" includes systems and computer program products). The processor may execute the computer readable program instructions thereby creating a mechanism for implementing the actions specified in the flowchart illustrations and/or block diagrams. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the actions specified in the flowchart illustrations and/or block diagrams. In particular, the computer readable program instructions may be used to produce a computer-implemented method by executing the instructions to implement the actions specified in the flowchart illustrations and/or block diagrams.

The computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

In the flowchart illustrations and/or block diagrams disclosed herein, each block in the flowchart/diagrams may represent a module, segment, or portion of instructions, which comprises one or more executable instructions for implementing the specified logical function(s). In some implementations, the functions noted in the blocks may occur out of the order noted in the Figures. For example, two blocks shown in succession may, in fact, be executed substantially concurrently, or the blocks may sometimes be executed in the reverse order, depending upon the functionality involved.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A system for certifying user permissions, the system comprising:

an entitlement engine configured to generate an entitlement logic code within a distributed computing environment;

a user computing device comprising at least one processor, a memory, and a communication device, wherein the user computing device is configured to communicate with the entitlement engine; and a server computer system comprising at least one processor, a memory, and a communication device, wherein the server computer system is configured to communicate with the entitlement engine;

wherein the user computing device is configured to:

initiate presentation of a graphical user interface enabling display of an entitlement engine, the entitlement engine comprising a list of secondary users and a list of application features;

receive user input, from a user input device, selecting one or more permissions corresponding to at least one of the list of secondary users and at least one of the list of application features; and initiate transmission of the selected one or more permissions across a communication channel between the user computing device and the server computer system; and wherein the server computer system is configured to:

receive the transmission of the one or more permissions from the user computing device, and over the communication channel;

analyze the received transmission to identify information to be stored, including identifying the one or more permissions corresponding to the at least one of the list of secondary users and the at least one of the list of application features;

associate the one or more permissions with a user profile of the at least one of the list of secondary users, wherein the user profile comprises: job title, user type, tenure, and location;

generate an entitlement logic code, based on the user profile, wherein the entitlement logic code comprises executable code indicating the one or more permissions associated with the user profile and the entitlement logic code is configured to update based on changes to the user profile, and when the entitlement logic code is executed, a digital account environment of the at least one of the list of secondary users comprises the one or more permissions associated with the user profile; and store the entitlement logic code in the user profile.

2. The system according to claim 1, wherein the user computing device is further configured to:

receive second user input from a secondary user, the second input comprising a request for access to an application and user authentication data;

initiate a transmission of the user authentication data between the user computing device and the server computer system across the communication channel; and wherein the server computer system is further configured to:

receive the transmission of the user authentication data from the user computing device, and over the communication channel;

validate the secondary user, based on the user authentication data;

retrieve the user profile associated with the secondary user;

retrieve the stored entitlement logic code from the user profile; and initiate a transmission of the stored entitlement logic code between the server computer system and the user computing device across the communication channel.

3. The system according to claim 2, wherein the user computing device is further configured to:

receive the transmission of the stored entitlement logic code from the server computer system, and over the communication channel; and initiate presentation of a second graphical user interface display of a dashboard of the secondary user, the dashboard of the secondary user comprising services and data based on the stored entitlement logic code.

4. The system according to claim 1, wherein the user type comprises custom-access or full-access.

5. The system according to claim 1, wherein the user type comprises administrator or standard.

6. The system according to claim 1, wherein the one or more permissions comprise one or more of: viewing an application feature from the list of application features, using the application feature from the list of application features, and making changes to the application feature from the list of application features.

7. A system for certifying user permissions comprising, the system comprising:

an entitlement engine configured to generate an entitlement logic code within a distributed computing environment;

a user computing device comprising at least one processor, a memory, and a communication device, wherein the user computing device is configured to communicate with the entitlement engine; and a server computer system comprising at least one processor, a memory, and a communication device, wherein the server computer system is configured to communicate with the entitlement engine;

wherein the user computing device is configured to:

receive user input from a secondary user, the input comprising a request for access to an application and user authentication data;

initiate a transmission of the user authentication data between the user computing device and the server computer system across the communication channel; and wherein the server computer system is further configured to:

receive the transmission of the user authentication data from the user computing device, and over the communication channel;

validate the secondary user, based on the user authentication data;

retrieve a user profile associated with the secondary user, wherein the user profile comprises: job title, user type, tenure, and location;

generate an entitlement logic code based on the user profile, wherein the entitlement logic code comprises executable code indicating the one or more permissions associated with the user profile, and the entitlement logic code is configured to update based on changes to the user's profile, and when the entitlement logic code is executed, a digital account environment of the at least one of the list of secondary users comprises the one or more permissions associated with the user profile; and initiate a transmission of the entitlement logic code between the server computer system and the user computing device across the communication channel.

8. The system according to claim 7, wherein the user computing device is further configured to:

receive the transmission of the entitlement logic code from the server computer system, and over the communication channel; and initiate presentation of a second graphical user interface display of a dashboard of the secondary user, the dashboard of the secondary user comprising services and data based on the entitlement logic code.

9. The system according to claim 7, wherein the user type comprises custom-access or full-access.

10. The system according to claim 7, wherein the user type comprises administrator or standard.

11. The system according to claim 7, wherein the one or more permissions comprise one or more of: viewing an application feature from the list of application features, using the application feature from the list of application features, and making changes to the application feature from the list of application features.

12. A method for certifying user permissions comprising, the method being executed by a server computer system interoperating with a user computing devices, the method comprising:

initiating, on the user computing device, presentation of a graphical user interface enabling display of an entitlement engine, the entitlement engine comprising a list of secondary users and a list of application features and configured to generate an entitlement logic code within a distributed computing environment, wherein the server computer system is configured to communicate with the entitlement engine and the user computing device is configured to communicate with the entitlement engine;

receive user input, from a user input device, selecting one or more permissions corresponding to at least one of the list of secondary users and at least one of the list of application features;

initiating transmission of the selected one or more permissions across a communication channel between the user computing device and the server computer system;

receiving, on the server computer system, transmission from the user computing device and over the communication channel, of the transmitted one or more permissions;

analyzing, the received transmission to identify information to be stored, including identifying the one or more permissions corresponding to the at least one of the list of secondary users and the at least one of the list of application features;

associating the one or more permissions with a user profile of the at least one of the list of secondary users, wherein the user profile comprises: job title, user type, tenure, and location;

generating an entitlement logic code, based on the user profile, wherein the entitlement logic code comprises executable code indicating the one or more permissions associated with the user profile, and the entitlement logic code is configured to update based on changes to the user's profile;

storing the entitlement logic code in the user profile; and executing the entitlement logic code, wherein executing the entitlement logic code results in a digital account environment of the at least one of the list of secondary users comprising the one or more permissions associated with the user profile.

13. The method according to claim 12, further comprising:

receiving, with the user computing device, second user input from a secondary user, the second input comprising a request for access to an application and user authentication data;

initiating a transmission of the user authentication data between the user computing device and the server computer system across the communication channel; and receiving, on the server computer system, the transmission of the user authentication data from the user computing device, and over the communication channel;

validating the secondary user, based on the user authentication data;

retrieving the user profile associated with the secondary user;

retrieving the stored entitlement logic code from the user profile;

initiating a transmission of the stored entitlement logic code between the server computer system and the user computing device across the communication channel.

14. The method according to claim 13, further comprising:

receiving, on the user computing device, the transmission of the stored entitlement logic code from the computer, and over the communication channel; and initiating presentation of a second graphical user interface display of a dashboard of the secondary user, the dashboard of the secondary user comprising services and data based on the stored entitlement logic code.

15. The method according to claim 12, wherein the user type comprises custom-access or full-access.

16. The method according to claim 12, wherein the user type comprises administrator or standard.

17. The method according to claim 12, wherein the one or more permissions comprise one or more of: viewing an application feature from the list of application features, using the application feature from the list of application features, and making changes to the application feature from the list of application features.

* * * * *